Aug. 4, 1931.  A. FRIEDMAN  1,817,615
COUPLING MEMBER
Filed Feb. 29, 1928

Inventor
Arthur Friedman
by Edmund J. Fix Pas
Attorney

Patented Aug. 4, 1931

1,817,615

UNITED STATES PATENT OFFICE

ARTHUR FRIEDMAN, OF CLEVELAND, OHIO, ASSIGNOR TO THE CLEVELAND HEATER COMPANY, OF CLEVELAND, OHIO, A CORPORATION OF OHIO

COUPLING MEMBER

Application filed February 29, 1928. Serial No. 257,916.

This invention relates to water heaters and in particular the connectors or coupling members, which connect the circulating elements of the heater to the storage tank.

Heretofore, coupling members of this type and for this purpose consisted in general of a straight union connection by means of which the circulating coils of the heater were placed in communication with the storage tank. In automatically controlled water heaters a separate tapping was placed in the side of the tank for the reception of the thermostat which controlled the flow of gas to the heater burner. The additional tapping required in the tank for reception of the thermostat materially increases the cost of the tank and adds nothing to the appearance of the finished product.

One of the objects of this invention is to provide a storage automatic water heater with a minimum number of tappings or openings in the storage tank.

Another object of this invention is to provide a coupling member between the circulating coils of the heater and the storage tank which also provides a threaded opening for the reception of a thermostat.

My invention in general consists in the use of an angular connector adapted for reception in the storage tank of an automatic water heater, providing a connector for the circulating coils of the water heater as well as a tapping for the reception of a thermostat to control the operation of the water heater.

The advantage of this construction is a material reduction in the initial cost of the elements used in fabricating a water heater of this type. The assembly requires a fewer number of parts, the piping is simplified, the labor of assembling is lessened, one tapping is eliminated in the storage tank and the appearance of the heater is greatly improved thereby.

Figure 1:
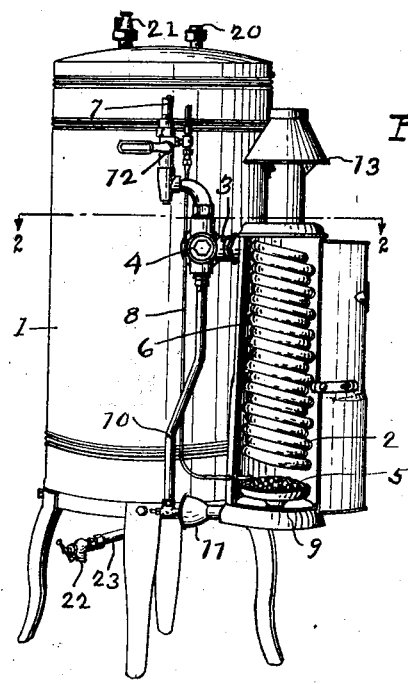
Figure 2:
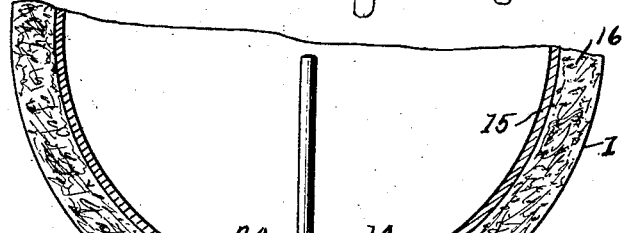
Figure 3:
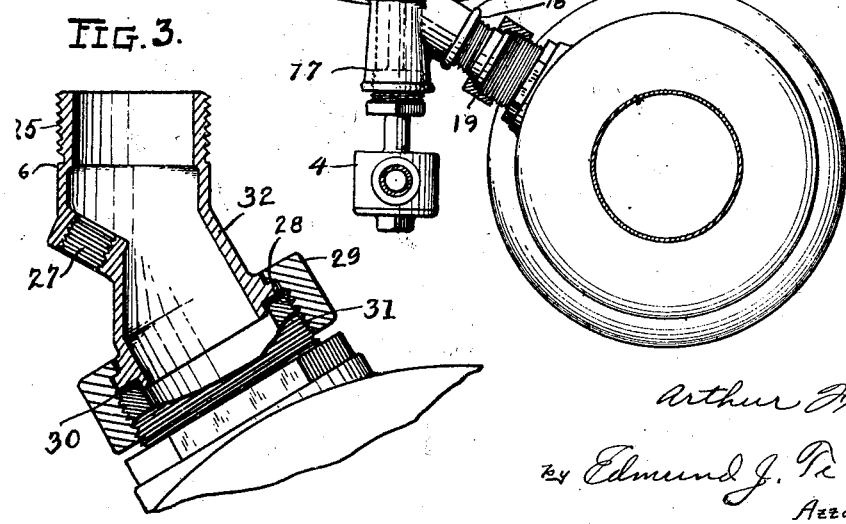

Referring to the drawings, Fig. 1, is a side elevation of a water heater constructed in accordance with and adapted for use in practicing my invention. Fig. 2, is an enlarged sectional view taken on line 2—2 Fig. 1, showing the upper coupling member of the heater. Fig. 3 is a sectional view of another form of coupling member similar to the coupling shown in Fig. 2.

The water heater shown in the accompanying drawings illustrates the conventional form of storage automatic water heater to which I have applied my improved coupling member. The reference numeral 1, indicates the casing or covering of a storage tank which is adapted to contain a constant supply of hot water. Heater coils or water circulating elements 2 are supported by the tank by means of coupling members, the upper member 3 of which is shown in detail in Fig. 2. The lower coupling member which is not shown in the drawings may be made similar to the coupling member 3 without, however, the additional outlet necessary for reception of the thermostat 4.

Heat is supplied to the circulating elements 2 by means of a gas burner 5 positioned in the bottom of the heater jacket 6. Gas for operating the system is supplied by way of the feed pipe 7, from which a separate supply is piped by way of the conduit 8 for the purpose of maintaining a constantly burning pilot light above the burner at the point 9.

The thermostat 4 controls the flow of gas to the burner 5 by way of the conduit 10. Gas from the conduit 10 flows into a gas and air mixing tube 11 and thence to the burner 5 where it is ignited by the constantly burning pilot light at 9. When in operation, the burner 5 furnishes heat to the water circulating coils 2 for the purpose of heating the liquid contents of the tank 1.

A main shut off valve 12 is provided for manually shutting off the supply of gas to the burner 5. A down draft diverter 13 of the conventional type is mounted on the heater casing and is used for the purpose of preventing down drafts within the heater which might cause the extinguishment of the pilot light.

The coupling member 3 shown in detail in the enlarged view in Fig. 2, consists of a Y branch fitting which is externally threaded at 14 for screw threaded reception in a complementary tapping 24 formed in the storage tank 15. Heat insulating material 16 is located between the tank 15 and the housing or covering 1. The Y fitting 3 is internally threaded at 17 for reception of a thermostat of the conventional type. A second internally threaded opening 18 is provided for the reception of the union connection 19 which connects the circulating coils of the heater to the Y fitting.

The top of the storage tank 15 is provided with two openings or tappings for reception of the union connections 20 and 21, one of which is adapted to be placed in communication with a cold water supply conduit and the other connection is adapted for communication with the hot water piping system. Hot water withdrawn from the tank 15 is replaced by cold water from the water supply system. A faucet 22 is connected to the bottom of the tank 15 by means of pipe 22 and is provided for the purpose of draining and cleaning the tank 15 and also serves as a separate outlet for the withdrawal of hot water from the tank.

The coupling shown in Fig. 3 is a simplified form of coupling that may be used in place of the coupling shown in Fig. 2. The use of the separate male element 33 of the union connection is not required in the coupling shown in Fig. 3.

Referring to the drawings, the coupling consists of an angular fitting 32 made in a single piece and having wrench engaging faces 26 integrally formed thereon. An externally threaded portion 25 is provided for the reception of the fitting in a storage tank. An internally threaded opening 27 is provided for reception of a thermostat.

An annular shoulder 28 integrally formed on the coupling member 32 cooperates with the union nut 29 and constitutes a union connection with the externally threaded water heater coil coupling 31 and the tank coupling member 32. A gasket 30 is positioned between the contacting faces of coupling to provide a fluid tight joint at this point.

It might be advisable in some cases to place my improved connector at the lower ends of the circulating coils. This could be readily accomplished by inter-changing the upper and lower connectors of the heater. The effect of such a change would be that of making the thermostat responsive to the temperature of the water of the lower portion of the tank, which under some conditions might be advantageous.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

I claim:

1. In a water heater, the combination of a storage vessel having openings, one of which is in its side, water circulating elements adapted for connection therewith, a gas burner to supply heat to said circulating elements, a thermostat to control the operation of said gas burner, and a relatively short integrally formed fitting for connecting said circulating elements to the side opening of said vessel and for supporting said elements alongside of and closely adjacent to said vessel, said fitting having opposite ends communicating with each other by way of a passageway having a single bend of less than ninety degrees adapted for reception in the side of said vessel and for connection to said circulating elements for establishing communication therebetween and having an opening intermediate said ends and opposite the end secured in said vessel for receiving said thermostat and supporting it in a horizontal position in said vessel.

2. In a water heater, the combination of a storage vessel having openings one of which is in its side, a heating coil adapted for communication with the openings of said vessel, and a Y fitting for connecting said coil to said vessel having three branches one of which is adapted to be received in the side opening of said vessel, another branch of which is adapted for connection to said coil for establishing communication with said vessel, and a thermostat adapted for horizontal reception in said vessel by way of the third branch of said Y fitting.

3. In a water heater the combination of a storage tank having a tapped opening in the side thereof, a heater coil adapted for communication with the opening of said tank, and a Y fitting for effecting such communication, said fitting having a threaded branch for reception in the opening of said tank, a flanged branch opposite thereto for connection with the heater coil, a union nut for effecting such connection, and a third branch opposite to said first named branch for reception of a control device.

4. In a water heater, the combination of a storage vessel having an opening in its side, a heating coil adapted for communication with the openings of said vessel, a coupling member permanently secured to the end of said coil and a Y fitting for connecting said coil to said tank having three branches one of which is threaded and adapted to be received in the opening of said tank, a second branch providing a threaded opening opposite thereto for the reception of a control device, and a third branch having a flange seating face for engagement with said coupling member, and an apertured or union nut for effecting such engagement.

5. In a water heater, the combination of a storage vessel having opening, one of which is in its side, water circulating elements adapted for connection therewith, a gas burner to supply heat to said circulating elements, a thermostat to control the operation of said gas burner, and a relatively short integrally formed fitting for connecting said circulating elements to the side opening of said vessel and for supporting said elements alongside of and closely adjacent to said vessel, said fitting having opposite ends communicating with each other by way of a passageway having a single bend of less than ninety degrees adapted for reception in the side of said vessel and for connection to said circulating elements for establishing communication therebetween and having an opening intermediate the ends of said fitting and disposed at an angle thereto for receiving said thermostat and supporting it in a horizontal position in said vessel.

In testimony whereof I affix my signature.

ARTHUR FRIEDMAN.